United States Patent
Nishiura et al.

(10) Patent No.: US 8,002,067 B2
(45) Date of Patent: Aug. 23, 2011

(54) ELECTRIC MOTORCYCLE

(75) Inventors: Hisao Nishiura, Saitama (JP); Shinji Furuta, Saitama (JP); Makoto Hasegawa, Saitama (JP); Takato Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 25 days.

(21) Appl. No.: 12/568,578

(22) Filed: Sep. 28, 2009

(65) Prior Publication Data

US 2010/0078249 A1 Apr. 1, 2010

(30) Foreign Application Priority Data

Sep. 30, 2008 (JP) ................................. 2008-255307
Sep. 30, 2008 (JP) ................................. 2008-255460

(51) Int. Cl.
*B62K 11/02* (2006.01)
*B62M 7/12* (2006.01)

(52) U.S. Cl. ....... 180/220; 180/218; 180/65.1; 180/68.5

(58) Field of Classification Search .................. 180/220, 180/218, 65.1, 68.5
See application file for complete search history.

(56) References Cited

U.S. PATENT DOCUMENTS

| | | | |
|---|---|---|---|
| 5,421,427 A * | 6/1995 | Ogawa et al. ................. | 180/220 |
| 5,613,569 A * | 3/1997 | Sugioka et al. ............... | 180/68.5 |
| 6,176,338 B1 | 1/2001 | Nakagawa et al. | |
| 6,357,542 B1 | 3/2002 | Sako | |
| 7,210,550 B2 * | 5/2007 | Yonehana et al. ............ | 180/220 |
| 2004/0069549 A1 * | 4/2004 | Ono et al. ..................... | 180/65.8 |
| 2005/0177285 A1 * | 8/2005 | Honda ............................ | 701/22 |
| 2005/0217910 A1 * | 10/2005 | Yonehana et al. ........... | 180/68.5 |
| 2010/0078248 A1 * | 4/2010 | Kanno et al. .................. | 180/220 |

FOREIGN PATENT DOCUMENTS

| | | |
|---|---|---|
| JP | 7-112617 A | 5/1995 |
| JP | 3317560 B2 | 8/2002 |
| WO | WO 99/11507 | 3/1999 |

* cited by examiner

*Primary Examiner* — Paul N Dickson
*Assistant Examiner* — Marlon A Arce
(74) *Attorney, Agent, or Firm* — Birch, Stewart, Kolasch & Birch, LLP

(57) ABSTRACT

The weight balance of an electric motorcycle including a battery, a power drive unit, and a driving power generating motor, in the left-and-right direction or in the frontward-and-rearward direction is easily secured. An electric motorcycle includes a power drive unit and a driving power generating motor which are mounted to a swing arm swinging about a pivot shaft in an upward-and-downward direction. A rear wheel WR is driven by the power generating motor. The electric motorcycle includes a battery to supply electric power to the power generating motor. A center of gravity (BC) of the battery is located at the side opposite to the power drive unit and the power generating motor about a central line CX of a motorcycle body.

20 Claims, 8 Drawing Sheets

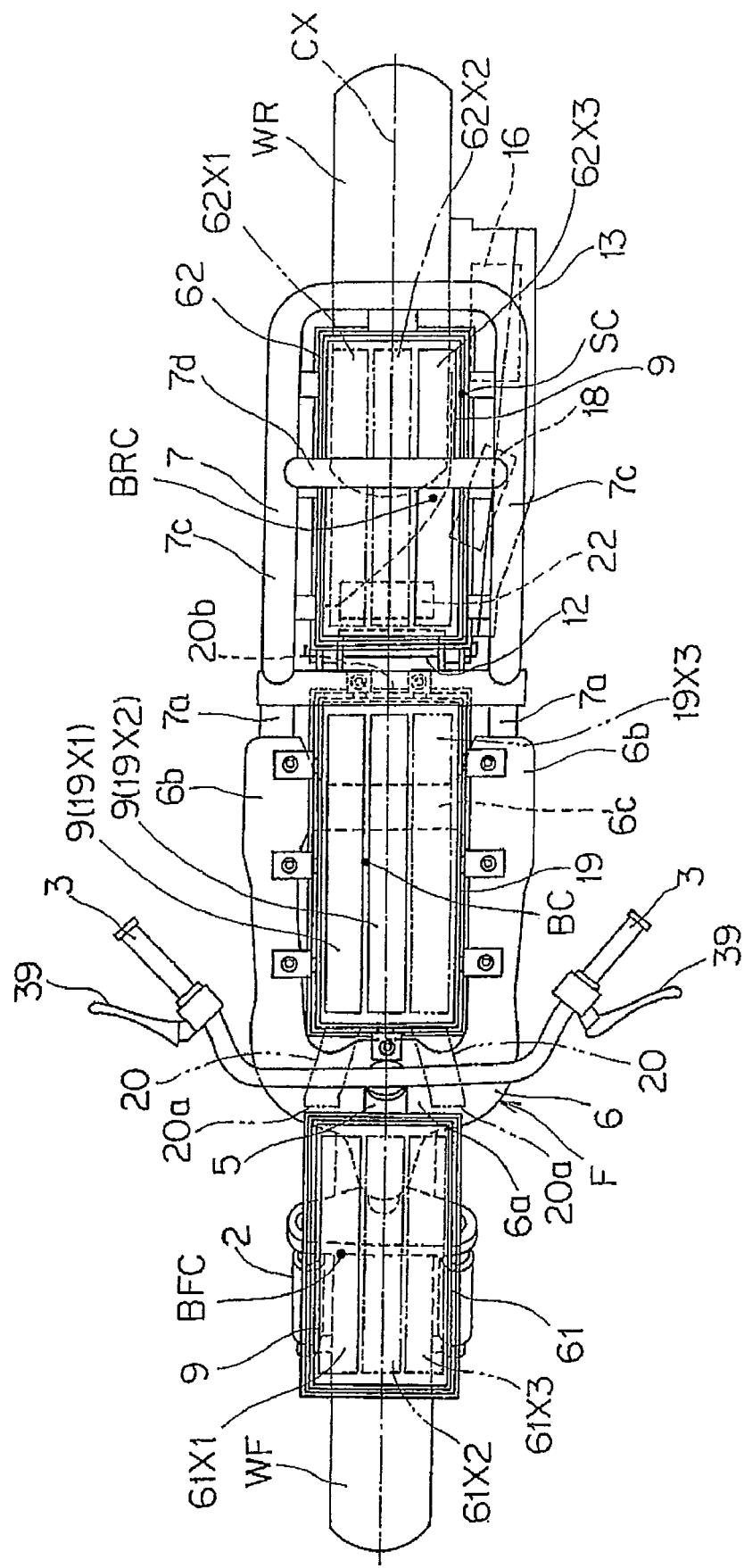

ELECTRIC MOTORCYCLE

CROSS-REFERENCE TO RELATED APPLICATIONS

The present application claims priority under 35 USC 119 to Japanese Patent Application No. 2008-255460 filed on Sep. 30, 2008 and Japanese Patent Application No. 2008-255307 filed on Sep. 30, 2008 the entire contents of which are hereby incorporated by reference.

BACKGROUND OF THE INVENTION

1. Field of the Invention

The present invention relates to an electric motorcycle that is driven by an electric motor (a power generating motor). More particularly, to a component arrangement structure of the electric motorcycle wherein the electric motor is supported by a swing arm.

2. Description of Background Art

Generally, an electric motorcycle includes a battery, a power generating motor to generate a drive force for the electric motorcycle based on electric power supplied from the battery, and a power drive unit to control the supply of electric power from the battery to the power generating motor. A drive power current is input from the battery to the power generating motor via the power drive unit to drive the power generating motor, with the result that a rear wheel is driven. Consequently, the electric motorcycle is driven, see, for example, JP Patent No. 3317560.

Since the electric motor and the battery are very heavy, the battery which is heavy is arranged below a footrest space in consideration to balance the electric motorcycle body in order to achieve a low center of gravity, for example, JP-A No. H7-112617. Further, it is necessary to sufficiently consider the arrangement of these components of the electric motorcycle so as to secure a weight balance of the electric motorcycle in the left-and-right direction or in the frontward-and-rearward direction.

SUMMARY AND OBJECTS OF THE INVENTION

Therefore, it is an object of an embodiment of the present invention to easily secure the weight balance of an electric motorcycle, including a battery, a power drive unit, and a driving power generating motor, in the left-and-right direction or in the frontward-and-rearward direction of the motorcycle.

In order to address the above problem, a first embodiment of the present invention provides an electric motorcycle including a power drive unit and a driving power generating motor which are mounted to a swing arm swinging about a pivot shaft in an upward-and-downward direction with a rear wheel driven by the power generating motor. The electric motorcycle includes a battery to supply electric power to the power generating motor. A center of gravity of the battery is located at a side opposite to the power drive unit and the power generating motor about a central line of a motorcycle body.

According to the above construction, it is possible to easily secure the weight balance of the electric motorcycle in the left-and-right direction.

In this case, the center of gravity of the battery and a center of gravity of the swing arm may be located on almost the same horizontal plane.

According to the above construction, it is possible to more positively secure the weight balance in consideration of moment.

Also, a battery box may be disposed below a footrest space, and the battery may be disposed in the battery box.

According to the above construction, it is possible to achieve a lower center of gravity as well as weight balance in the left-and-right direction.

Also, a step floor of the footrest space may be formed in an openable and closable manner, and an opening formed at a top of the battery box, in which the battery is accommodated, may be covered by the step floor in a hermetically sealed manner.

According to the above construction, when the step floor having a footrest flat across the left and right of the motorcycle is opened, the inside of the battery box is opened upward. Thus, the battery is easily removed upward. In addition, the opening of the battery box is covered by the step floor in a hermetically sealed manner. With this construction rainwater or the like is prevented from entering the inside.

In this case, if employing the construction that a main frame is disposed above a battery box as described in JP-A No. H7-112617, the battery is attached and detached from the side of the motorcycle body in the lateral direction of the motorcycle body. In this case, since a cover, which is opened and closed at the time of maintenance, is disposed at a lateral wall of the battery box, operations to remove the cover and to remove the battery from the side of the motorcycle body in the lateral direction of the motorcycle body are not easy.

Thereupon, the present electric motorcycle may include a pair of left and right center frames extending in a frontward-and-rearward direction of a motorcycle body below a footrest space and a step floor disposed above the pair of left and right center frames. The step floor includes a flat footrest. A battery box, formed in the shape of a box open at a top thereof and having a battery to drive the power generating motor accommodated therein, may be supported between the pair of left and right center frames in a suspension manner. The step floor may be formed in such a manner that the step floor is opened and closed. An opening of the top of the battery box may be covered by the step floor in a hermetically sealed manner.

According to the above construction, since the battery box, formed in the shape of the box open at the top thereof and having the battery to drive the power generating motor accommodated therein, is supported between the pair of left and right center frames in the suspension manner, a main frame is not located above the battery box. Consequently, when the step floor having the flat footrest across the left and right of the motorcycle is opened, the rear surface of the battery box is opened upward and the battery is removed upward, thereby facilitating the removal operation.

Further, the footrest of the step floor is flat, thereby stabilizing feet of an occupant. Since the opening of the battery box is covered by the step floor in a hermetically sealed manner, rainwater or the like is prevented from entering the inside of the battery box.

Furthermore, the step floor may be detachably mounted to the pair of left and right center frames.

According to the above construction, the support structure of the step floor is simplified.

Further, a battery box stay to support the battery box may be mounted between the pair of left and right center frames, and the battery box stay and the step floor may be detachably mounted to the center frames by the same stopping member.

According to the above construction, the support structure of the battery box and the support structure of the step floor are simplified.

Further, the step floor may be provided at a rear surface thereof with a rib extending in the frontward-and-rearward direction of the motorcycle body, and a lower end of the rib may be fitted in a receiving part provided at an edge of the opening of the battery box via a seal member.

According to the above construction, the hermetic sealability of the battery box is improved.

Also, a battery is additionally installed in the vicinity of a head pipe and/or in the vicinity of a rear frame.

According to the above construction, it is possible to increase the total battery capacity and, in addition, to secure the weight balance in the frontward-and-rearward direction.

According to the electric motorcycle of an embodiment of the present invention, the electric motorcycle has a battery to supply electric power to the power generating motor, and the center of gravity of the battery is located at the side opposite to the power drive unit and the power generating motor about the central line of the motorcycle, thereby satisfactorily securing the weight balance of the electric motorcycle in the left-and-right direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a plan view of FIG. 7.

DETAILED DESCRIPTION OF THE PREFERRED EMBODIMENTS

In the following description, an upward-and-downward direction, a frontward-and-rearward direction, and a left-and-right direction are directions when viewed from a rider.

Figure 1:
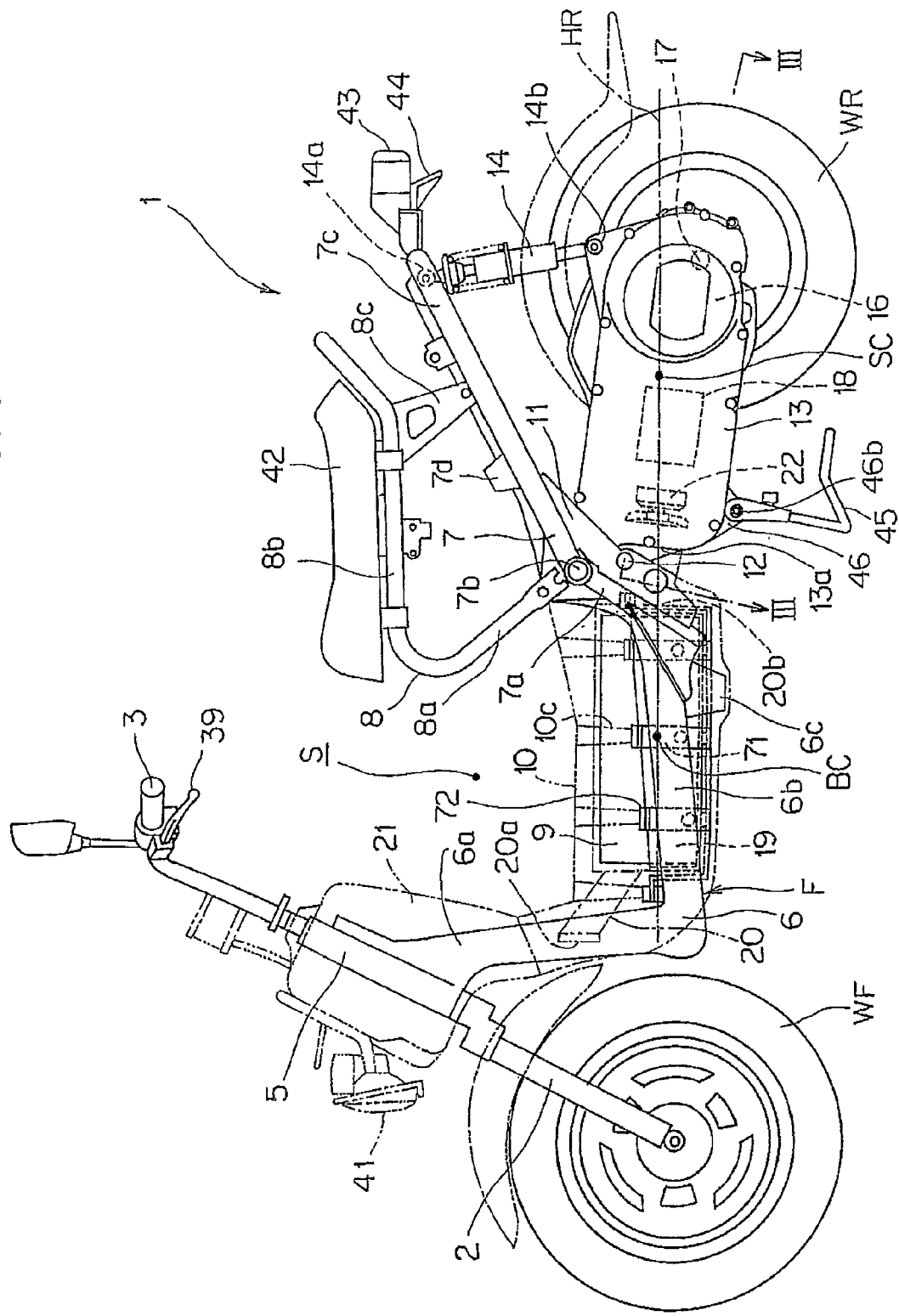
FIG. 1 is a side view illustrating an electric motorcycle according to a first embodiment of the present invention.
Figure 2:
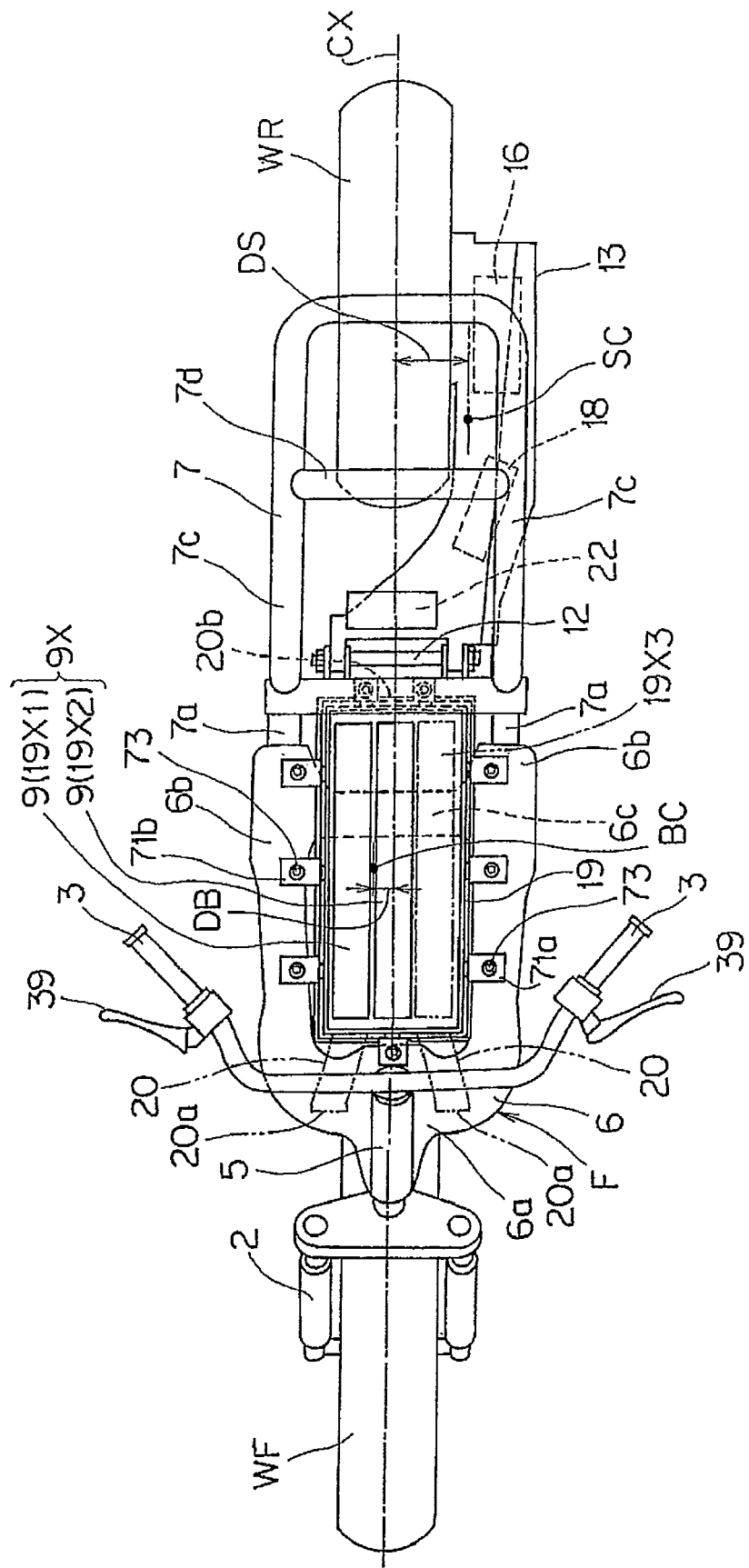
FIG. 2 is a plan view of FIG. 1.

FIG. 1 is a side view illustrating an electric motorcycle according to a first embodiment of the present invention, and FIG. 2 is a plan view of FIG. 1. For the convenience of description, seat rails 8, a fender cover 21, and a step floor 10 shown in FIG. 1 are omitted from FIG. 2.

As shown in FIG. 1, a motorcycle body frame F of an electric motorcycle 1 includes a front fork 2 to which a front wheel WF is journaled and a head pipe 5 to steerably support a steering handlebar 3 connected to the front fork 2. The front fork 2 and the head pipe 5 are located at a front end of the motorcycle body frame F. Also, the motorcycle body frame F includes center frames 6, rear frames 7, and seat rails 8. As shown in FIG. 2, these frames 6, 7, and 8 are provided in symmetrical pairs in the lateral direction of a motorcycle body.

Each of the center frames 6 includes an inclined part 6a connected to the head pipe 5 and extending obliquely downward to the rear of the motorcycle body and a horizontal part 6b bent from the lower end of the inclined part 6a and extending to the rear of the motorcycle body approximately in the horizontal direction. Also, as shown in FIG. 2, the center frames 6 are connected to each other by a cross member 6c connecting the left and right horizontal parts in the lateral direction of the motorcycle.

Also, each of the rear frames 7 includes a first inclined part 7a extending obliquely upward from the rear end of the horizontal part 6b of the corresponding center frame 6 toward the rear of the motorcycle body and a second inclined part 7c extending obliquely upward from a bent part 7b bent at the rear end of the first inclined part 7a toward the rear of the motorcycle body with a gentle inclination relative to the first inclined part 7a. Also, as shown in FIG. 2, the left and right second inclined parts 7c are connected to each other by a cross frame 7d extending in the lateral direction of the motorcycle body.

Furthermore, the seat rails 8 are provided above the rear frames 7 approximately in an inverse U shape. Each of the seat rails 8 includes an inclined part 8a extending upward from the bent part 7b of the corresponding rear frame 7 toward the front of the motorcycle body, a horizontal part 8b extending obliquely rearward from the upper end of the inclined part 8a in the horizontal direction, and a support part 8c extending rearward and obliquely downward from the rear part of the horizontal part 8b toward the second inclined part 7c of the corresponding rear frame 7.

As shown in FIGS. 1 and 2, batteries 9, which will be described in detail later, are accommodated in a battery box 19 at the horizontal parts 6b of the center frames 6. The battery box 19 is provided in such a manner that the battery box 19 is interposed between the left and right pair of the frames of the horizontal parts 6b. In the side view of FIG. 1, the bottom of the battery box 19 is located lower than the horizontal parts 6b. Also, the cross member 6c of the center frames 6 is configured such that the middle of the cross member 6c is depressed downward in the lateral direction of the motorcycle body. The battery box 19 is fixed in a state in which the battery box 19 is placed on the cross member 6c.

The part where the battery box 19 is disposed is located below a so-called footrest space S, and the top of the battery box 19 is covered by the step floor 10 which the feet of a rider rest upon.

The battery box 19 is formed in the shape of an approximately rectangular parallelepiped box which accommodates the plurality of batteries 9 therein. At the front of the battery box 19 are provided left and right air introduction ducts 20 to introduce external air into the battery box. At the rear of the battery box 19 is formed a discharge port 20b to discharge the introduced external air.

Consequently, it is possible to cool the batteries 9 by external air introduced through introduction ports 20a and to discharge the air through the discharge port 20b after the cooling.

Figure 3:
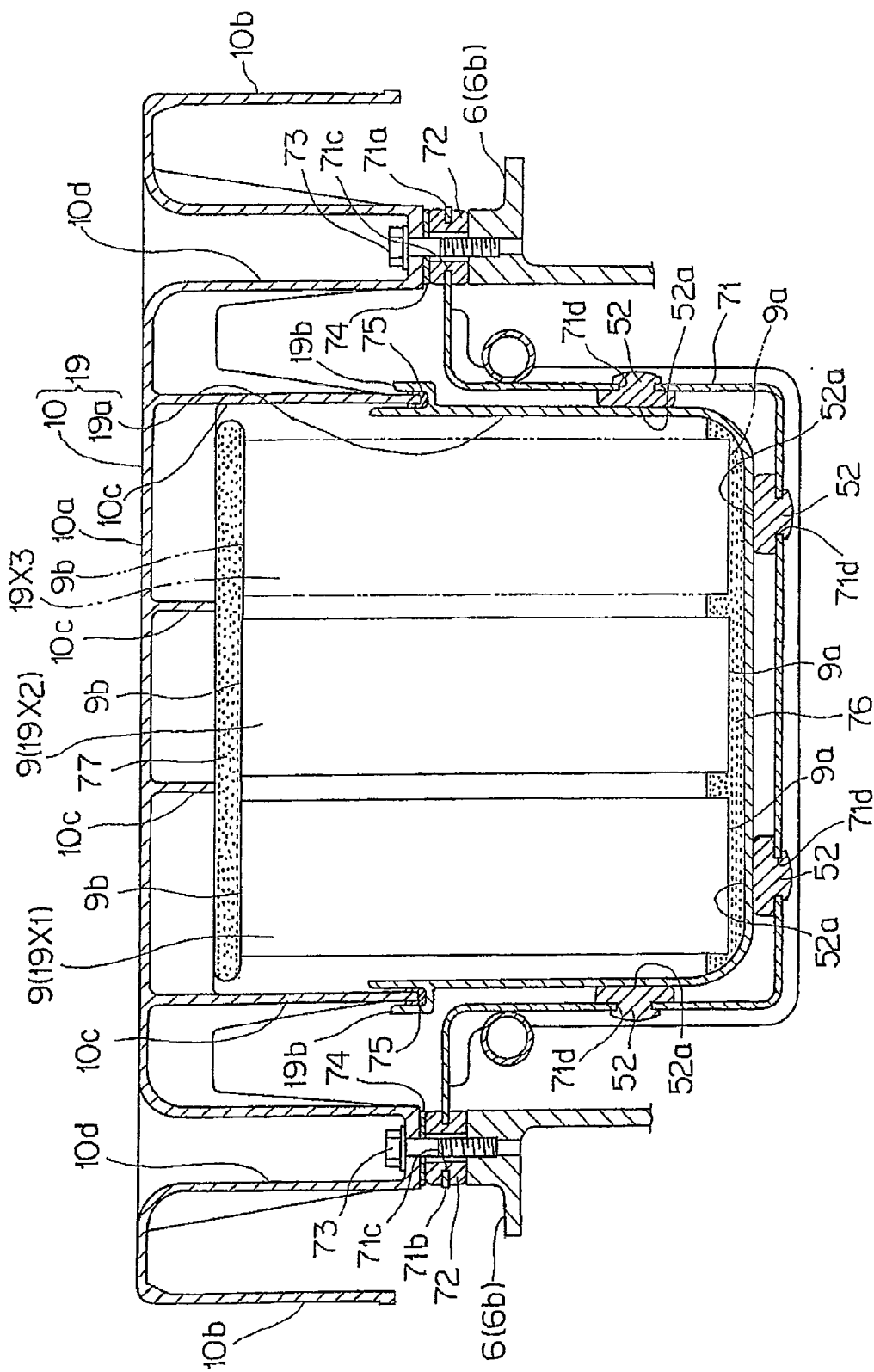
FIG. 3 is a sectional view illustrating a battery box.

FIG. 3 is a sectional view of the battery box 19.

The pair of left and right center frames 6 extends in the frontward-and-rearward direction of the motorcycle body below the footrest space. The step floor 10 is located above the pair of left and right center frames 6. The step floor 10 has a footrest 10a uniformly flat in the lateral direction of the motorcycle body. To the horizontal parts 6b of the center frames 6 are mounted battery box stays 71, made of steel sheet and bent in the shape of an inverse Ω, to support the battery box 19 in a suspension manner.

In both ends 71a and 71b of each of the battery box stays 71 are formed holes 71c, and anti-vibration rubbers 72 are fitted in the holes 71c. The battery box stays 71 are mounted to the horizontal parts 6b of the center frames 6 by bolts 73 passing through holes of the anti-vibration rubbers 72.

As shown in FIGS. 1 and 2, three battery box stays 71 are provided such that the battery box stays 71 are arranged at appropriate intervals in the frontward-and-rearward direction of the motorcycle body. The battery box 19 is mounted such that the battery box 19 is supported by the three battery box stays 71, the width of the battery box 19 is interposed between the horizontal parts 6b of the pair of left and right center frames 6, and the length of the battery box 19 is also interposed between the horizontal parts 6b of the pair of left and right center frames 6.

As shown in FIG. 3, the battery box 19 includes a box-shaped box body 19a open at the upper end thereof and the step floor 10 having a covering structure to cover the upper end of the box body 19a in a hermetically sealed manner The box body 19a is supported by interposing a plurality of resin cushion members 52 between the box body 19a and the battery box stays 71. The cushion members 52 have flat faces 52a supported in holes 71d of the battery box stays 71 and abutting on the outer face of the box body 19a.

The step floor 10 is made of resin. The step floor 10 is formed approximately in the shape of a box open at the lower part thereof. At the rear surface thereof, the step floor 10 includes a wall part 10b positioned at the outer circumference thereof and a plurality of reinforcement ribs 10c extending in the frontward-and-rearward direction of the motorcycle body. The step floor 10 has depressions 10d, into which the bolts 73 are inserted, formed in the shape of a ring when viewed from the top thereof at three left-side spots and three right-side sports, i.e., a total of six spots, when viewed from the top thereof (see FIG. 2). The step floor 10 is fixed to the horizontal parts 6b of the center frames 6 together with both the ends 71a and 71b of the battery box stays 71 via washers 74 and the anti-vibration rubbers 72 by the bolts (the same stopping members) 73 inserted into the depressions 10d.

In this case, the bolts 73 at the six spots are loosened or fastened by an exclusive tool that can be inserted into the depressions 10d. The step floor 10 is not opened without the use of the exclusive tool, and therefore, the battery is prevented from being stolen.

For example, caps (not shown) may be provided at the depressions 10d, and the caps may be opened and closed by an ignition key, to prevent the battery from being stolen.

The lower ends of the long ribs 10c at the rear surface of the step floor 10 are fitted in receiving parts 19b provided at the edge of the opening of the box body 19a. In the receiving parts 19b are disposed seal members 75 to hermetically seal the inside of the box body 19a when the opening of the box body 19a is covered by the step floor 10. At the end of the box body 19a in the frontward-and-rearward direction of the motorcycle body are also provided the same receiving parts (not shown). In the receiving parts are fitted the lower ends (not shown) of the ribs provided at the rear surface of the step floor 10. Seal members 75 are also interposed between the fitted parts. Consequently, the edge of the opening of the box body 19a is hermetically sealed along the entire circumference thereof.

In the box body 19a, a plurality (three in this embodiment) of battery accommodating spaces 19X1 to 19X3 are provided such that the battery accommodating spaces 19X1 to 19X3 extend across the inside of the battery box in the frontward-and-rearward direction of the motorcycle body and is laterally arranged at an appropriate interval in the width direction of the motorcycle body.

Meanwhile, since the box body 19a is premised to be commonly used in various kinds of electric motorcycles having different numbers (one to three) of batteries 9, the battery accommodating spaces 19X1 to 19X3 are configured to accommodate the rectangular batteries 9 therein. However, in this embodiment, it is necessary for the center of gravity of a battery 9 (or a battery group 9X including a plurality of batteries 9) to be located at the side opposite to a power drive unit 18 and a power generating motor 16 about a central line CX of the motorcycle body (in this embodiment, at the right side about the central line CX of the motorcycle body). Consequently, the batteries 9 are not accommodated in all the battery accommodating spaces 19X1 to 19X3. The battery 9 is not accommodated in at least the battery accommodating space 19X3.

More specifically, as shown in FIG. 2, the rectangular batteries 9 are disposed only in the battery accommodating space 19X1 and the battery accommodating space 19X2 such that the batteries 9 are arranged side by side. In addition, it is possible to minutely adjust an apparent center-of-gravity position of the battery 9 (or the battery group 9X) to be located more to the right of the central line CX of the motorcycle body and, in addition, to be the position of the central line CX of the motorcycle body side by accommodating a dummy battery lighter than the batteries 9 and not serving as a battery in the battery accommodating space 19X3, which is not in use, as compared with when the dummy battery is not accommodated in the battery accommodating space 19X3.

The batteries 9 are not particularly restricted as long as the batteries 9 can be charged and discharged. For example, the batteries 9 may be lithium ion batteries or nickel-metal hydride batteries. Lower ends 9a of the two batteries 9 are supported by resin interval control members 76 disposed at the bottom of the box body 19a, and upper ends 9b of the two batteries 9 are supported by resin support members 77 interposed between the batteries 9 and the step floor 10.

In this embodiment, electrode parts not shown are provided in the battery accommodating spaces 19X1 and 19X2 such that the electrode parts are electrically connected to electrodes of the batteries 9 when the batteries 9 are accommodated therein. In addition, electrode parts may be also provided in the battery accommodating space 19X3, however, the electrode parts are electrically isolated. Also, the battery accommodating spaces 19X1 19X2 have an electric circuit equivalent relation. For example, when only one battery is accommodated in the box body 19a, the battery accommodating spaces 19X1 and the 19X2 are electrically connected to each other such that the battery 9 can be accommodated in any one of the battery accommodating spaces 19X1 and 19X2. Consequently, it is possible to accommodate the batteries 9 in the battery accommodating spaces in consideration of the weight balance.

Since, in this embodiment, the battery box 19, which is formed in the shape of a box open at the top thereof and has the batteries 9 to drive the power generating motor 16 accommodated therein, is supported between the pair of left and right center frames 6 in a suspension manner. Therefore, a main frame and the like are not located above the battery box 19 as shown in FIG. 1. Consequently, as shown in FIG. 3, the six bolts 73 are removed using the exclusive tool (not shown) and the step floor 10 is opened, thereby the rear surface of the battery box 19 is opened upward, and the batteries 9 are easily removed upward.

The footrest 10a of the step floor 10 is flat across the left and right of the motorcycle, thereby stabilizing the feet of an occupant as compared with a step floor having a step part formed at the outside thereof.

When the step floor 10 is closed, the lower ends of the long ribs 10c at the rear surface of the step floor 10 are fitted into the receiving parts 19b provided at the edge of the opening of the box body 19a. The inside of the box body 19a is hermetically sealed since the seal members 75 are disposed in the receiving parts 19b. Further, the same receiving parts (not shown) are also provided at the end of the box body 19a in the frontward-and-rearward of the motorcycle body, and the seal members 75 are disposed also in the receiving parts. Consequently, the edge of the opening of the box body 19a is hermetically sealed along the entire circumference thereof, preventing rainwater from entering the box.

Since the step floor 10 is detachably mounted to the horizontal parts 6b of the pair of left and right center frames 6, no additional support stays are necessary, and therefore, it is possible to simplify the support structure of the step floor 10.

Also, the battery box stays 71 to support the battery box 19 are mounted between the horizontal parts 6b of the pair of left and right center frames 6. Therefore, by mounting the battery box stays 71 and the step floor 10 to the horizontal parts 6b of the center frames 6 by the same bolts 73, it is possible to simplify the support structure of the battery box 19 and the step floor 10.

Both the ends 71a and 71b of the battery box stays 71 are supported at the horizontal parts 6b of the center frames 6 via the anti-vibration rubbers 72, respectively. Then, the plurality of resin cushion members 52 are disposed at the battery box stays 71 to support the box body 19a of the battery box 19 and the batteries 9 are accommodated in the battery box 19, thereby improving vibration resistance of the battery box 19.

At the rear frames 7, as shown in FIG. 1, left and right pivot plates 11 protruding to the rear of the motorcycle body are provided below the bent parts 7b in the vicinity of connections with the center frames 7. At the left and right pivot plates 11 is provided a pivot shaft 12 which passes through the left and right pivot plates 11 in the lateral direction of the motorcycle. To the pivot shaft 12 is mounted the front end of a swing arm 13. The swing arm 13 swings upward and downward about the pivot shaft 12.

The swing arm 13 is connected to the second inclined part 7c of the corresponding rear frame 7 by a rear suspension 14 located at the left side in the lateral direction of the motorcycle body. More specifically, an upper end 14a of the rear suspension 14 is mounted to the second inclined part 7c of the corresponding rear frame 7. Also, a lower end 14b of the rear suspension 14 is mounted to the rear part of the swing arm 13. By mounting them so, upward-and-downward vibration of a rear wheel WR supported at the rear end of the swing arm 13 is absorbed by the rear suspension 14.

At the front end of the swing arm 13 are provided a pair of left and right rotation support parts 13b which are rotatably mounted to the pivot shaft 12. The left and right rotation support parts 13b are spaced apart from each other in the lateral direction of the motorcycle body. In a state in which the swing arm 13 is mounted to the pivot shaft 12, the swing arm 13 obliquely extends from the pivot shaft 12 (the rotation support parts 13b) to the left oblique to the rear of the motorcycle body in order to bypass the rear wheel WR, and subsequently extends to the rear of the motorcycle body along the left side of the rear wheel WR. At the rear of the swing arm 13 is provided a rear wheel shaft 17 extending in the lateral direction of the motorcycle body. The rear wheel WR is rotatably supported at the rear wheel shaft 17 in a cantilevered manner.

Note that in FIGS. 1 and 2, a head light 41 is provided to illuminate the front of the motorcycle body, an occupant seat 42 is mounted to the horizontal parts 8b of the seat rails 8, a brake lamp 43 is mounted to the rear ends of the rear frames 7 and a reflector 44 is located below the brake lamp 43.

Figure 4:
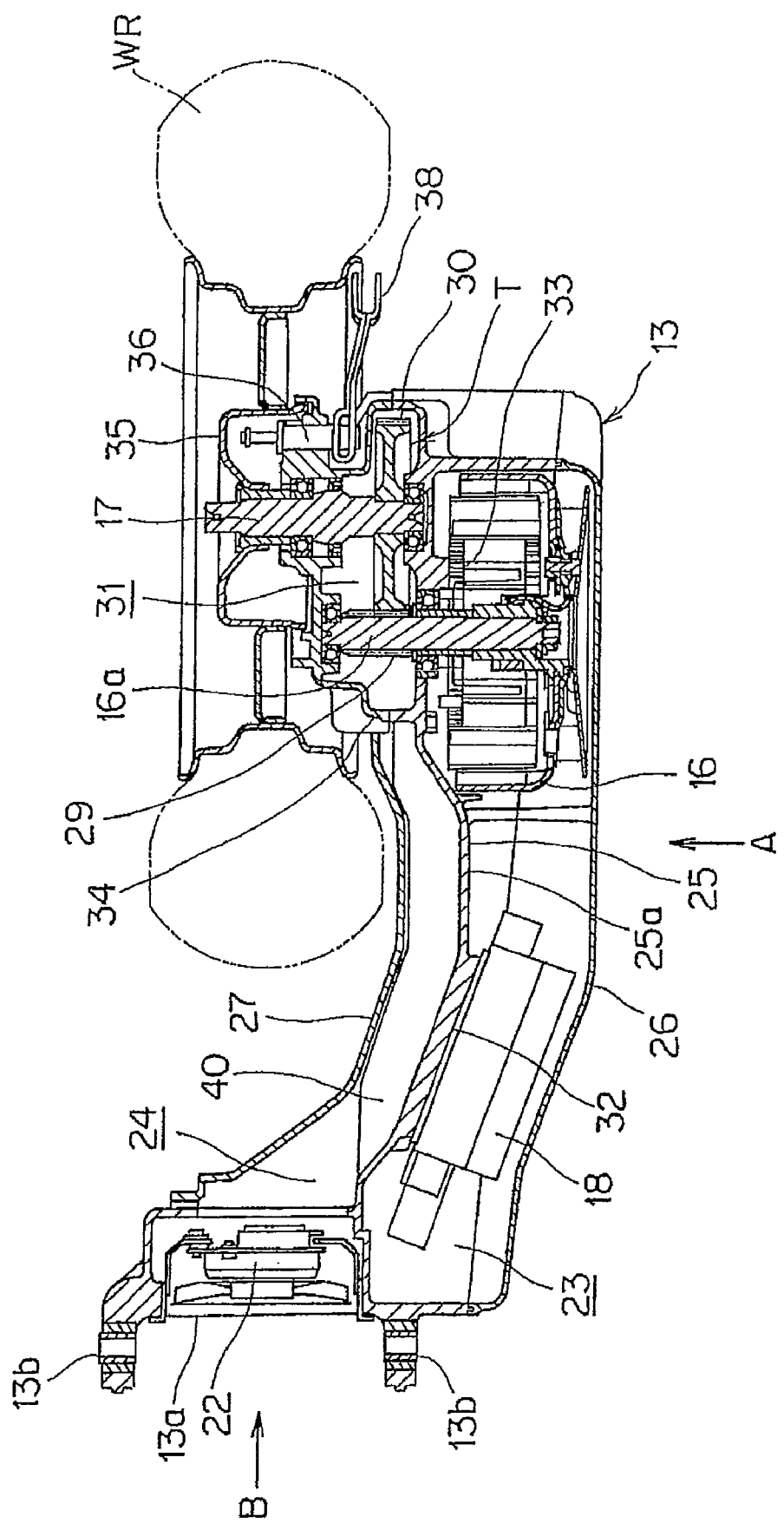
FIG. 4 is a sectional view taken along line III-III of FIG. 1, illustrating a swing aim as a single body.
Figure 5:
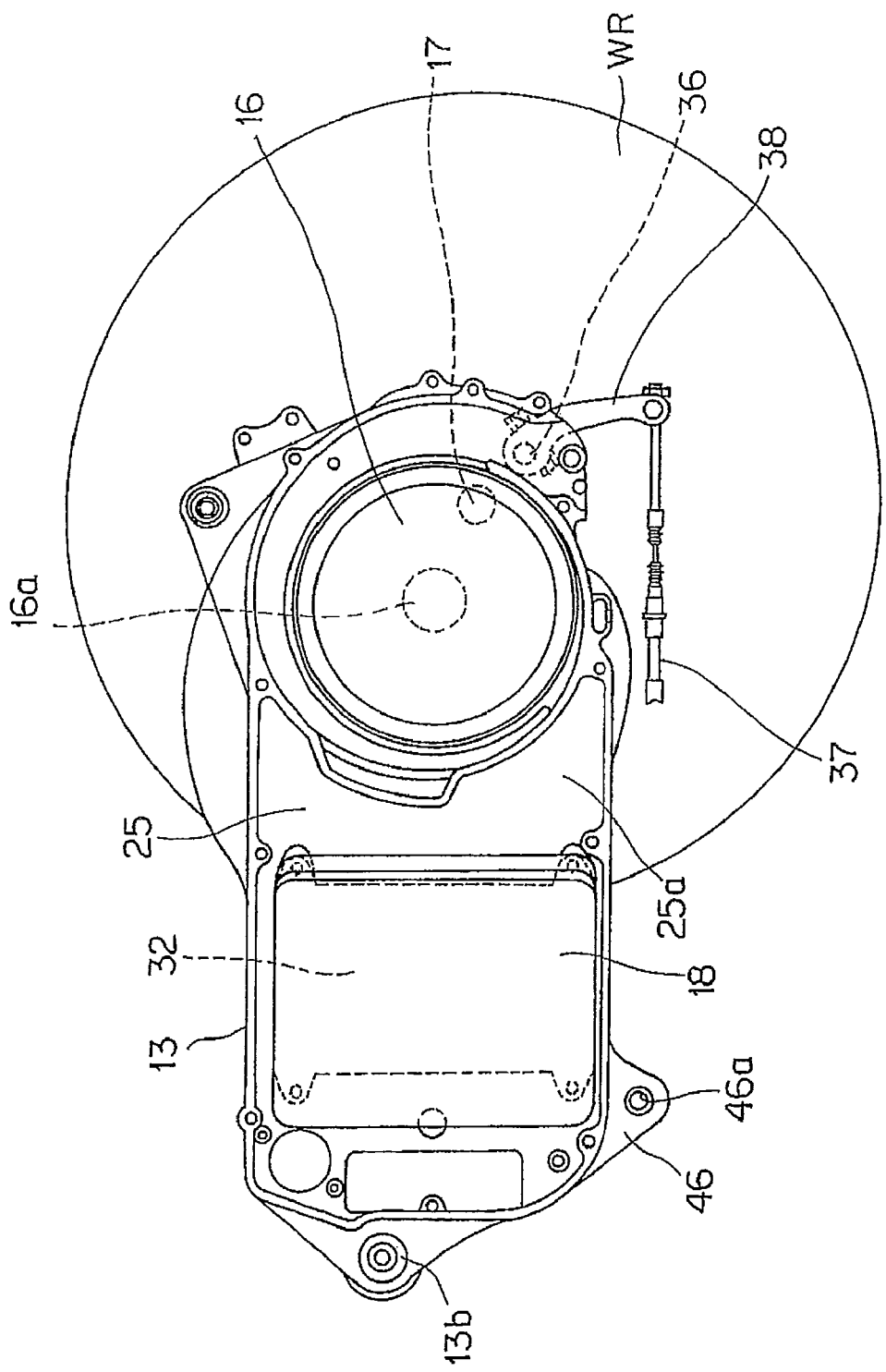
FIG. 5 is a right side view of FIG. 4.
Figure 6:
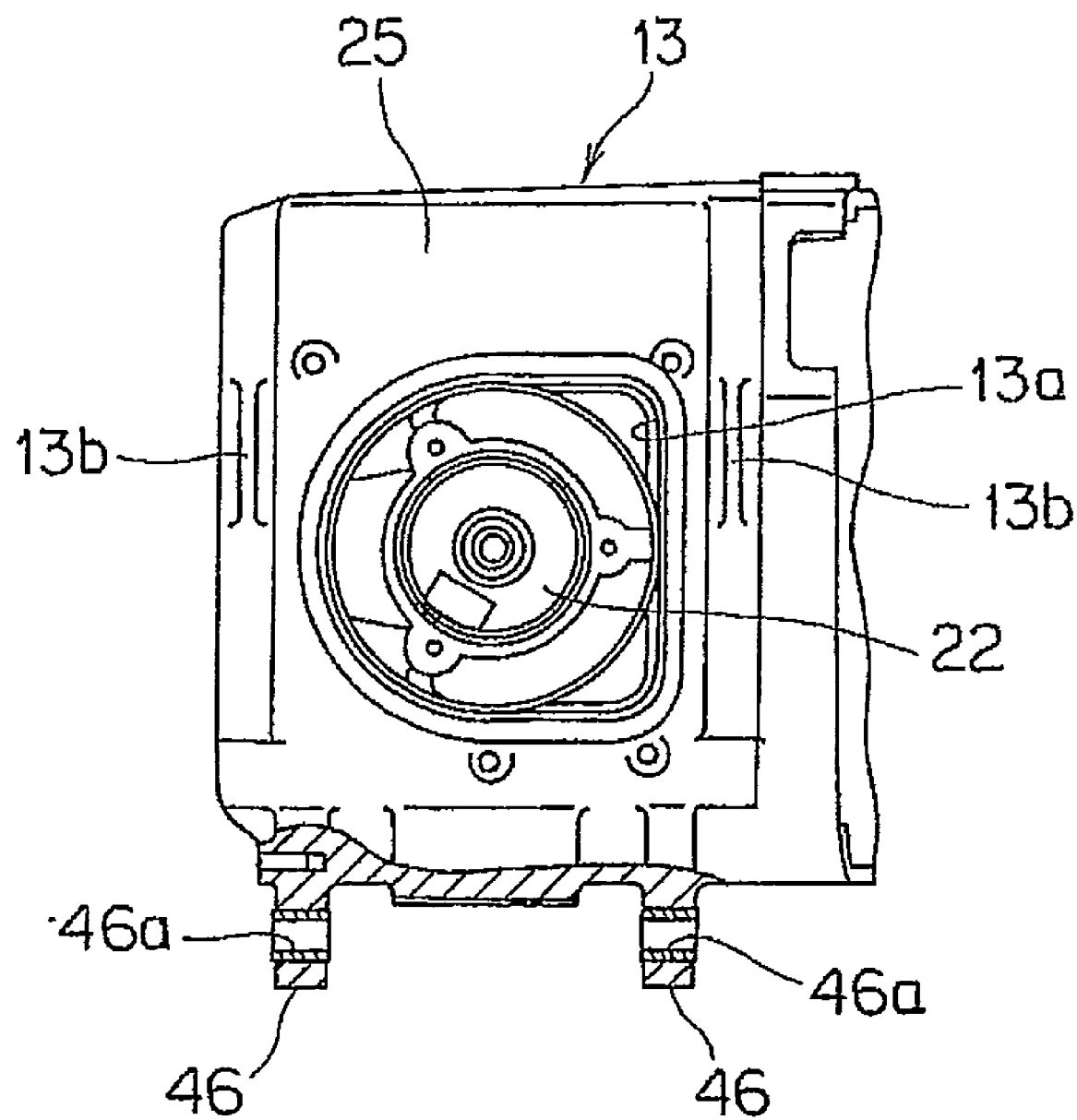
FIG. 6 is a view of FIG. 4 when viewed from the front side of a motorcycle body.

FIG. 4 is a sectional view taken along line III-III of FIG. 1, and is a plane view illustrating the swing arm 13 as a single body. Also, FIG. 5 is a right side view of FIG. 4 (when viewed in an A direction of FIG. 4), illustrating a state in which a left-side cover 26 shown in FIG. 4 is removed. Furthermore, FIG. 6 is a view of FIG. 4 when viewed from the front side of the motorcycle body (in a B direction of FIG. 4).

As shown in FIG. 4, the swing arm 13 is composed by assembling an arm body 25 having a partition wall 25a extending in the frontward-and-rearward direction of the motorcycle body, a left-side cover 26 configured to cover the left-side face of the arm body 25, and a right-side cover 27 configured to cover the right-side face of the arm body 25.

Two spaces are defined in the swing arm 13, namely, an equipment mounting space 23, which is located at the left side (the outside) of the motorcycle body and an air flow space 24, which is located at the right side (the inside) of the motorcycle body. These spaces 23 and 24 are divided from each other at the left and right side by the partition wall 25a in the lateral direction of the motorcycle body. The spaces 23 and 24 extend in the frontward-and-rearward direction of the motorcycle body.

Also, the left-side face of the equipment mounting space 23 is blocked by detachably mounting the left-side cover 26 to the left-side face of the equipment mounting space 23 with a bolt or the like. The right-side face of the air flow space 24 is blocked by detachably mounting the right-side cover 27 to the right-side face of the air flow space 24 with a bolt or the like in the same manner.

A power generating motor 16 to drive the rear wheel WR and a power drive unit (PDU) 18 to control the power generating motor 16 are accommodated within the equipment mounting space 23. Maintenance of the power generating motor 16 and the PDU 18 is possible by removing the left-side cover 26.

As shown in FIG. 4, the power generating motor 16 is disposed at the rear part of the swing arm 13, and is detachably mounted to a power generating motor mounting part 33 formed at the partition wall 25a. A drive shaft 16a of the power generating motor 16 is disposed approximately in parallel to the rear wheel shaft 17 of the rear wheel WR, passes through the partition wall 25a, and protrudes from the equipment mounting space 23 side to the air flow space 24 side. On the drive shaft 16a is provided a drive gear 29, which engages with a reduction gear 30 provided on the rear wheel shaft 17. The drive gear 29 has a smaller diameter than the reduction gear 30. The drive gear 29 transmits a drive force from the power generating motor 16 to the rear wheel shaft 17 in a one-step reduction manner.

Also, a gear cover 34 is mounted to the arm body 25 such that the gear cover 34 covers power transmission parts, such as the drive gear 29 and the reduction gear 30. The rear cover 34 divides a drive force transmission space 31 in which the power transmission parts are disposed and the air flow space 24 from each other. The rear cover 34 hermetically seals the inside of the drive force transmission space 31 such that lubricating oil is retained in the drive force transmission space 31.

Also, a pin member 36 to actuate a drum brake unit 35 is provided at the gear cover 34. The drum brake unit 35 is actuated by manipulating a brake handle 39 mounted to the left-side steering handlebar 3. More specifically, a brake lever 38 is rotated via a brake wire 37 shown in FIG. 5 by the manipulation of the brake handle 39, and the rear wheel WR is braked by the manipulation of the pin member 36 mounted to the brake lever 38.

As shown in FIGS. 2 and 4, the PDU 18 is disposed in front of the power generating motor 16, and is detachably mounted to a PDU mounting face 32 formed at the partition wall 25a by a bolt or the like. A drive circuit, a condenser, a heat sink, etc., which are not shown are accommodated in the PDU 18.

Also, the PDU 18 is connected to the batteries 9 via a wire not shown such that electric power is transmitted from the batteries 9 to the PDU 18. Also, the PDU 18 is connected to an electric control unit (ECU) not shown having a control program installed therein via a wire such that a control signal is transmitted from the ECU to the PDU 18. Furthermore, the PDU 18 is connected to the power generating motor 16 via a wire not shown such that electric power and a control signal are transmitted from the PDU 18 to the power generating motor 16. In addition, the ECU is mounted to the motorcycle body.

These drive circuits or the like of the PDU 18 generate a larger amount of heat than the remaining parts. For this reason, the PDU 18 is mounted to the PDU mounting face 32 of the partition wall 25a such that the PDU 18 is in tight contact with the PDU mounting face 32 of the partition wall 25a over as large an area as possible. Consequently, heat generated from the drive circuits or the like is transferred to the partition wall 25a, thereby achieving heat dissipation.

In the air flow space 24, on the other hand, a plurality of cooling fins 40 protrude from the partition wall 25a such that heat transferred from the PDU 18 to the partition wall 25a is further transferred to the cooling fins 40.

A front-side opening 13a is formed in the air flow space 24, which is located at the front end of the air flow space 24. A cooling fan 22 to blow air into the air flow space 24 is mounted to the front-side opening 13a. In the side view of FIG. 1, the cooling fan 22 is disposed between the battery box 19 and the PDU 18. Therefore, the cooling fan 22 also serves to suction air in the battery box 19 from the discharge port 20b. More specifically, the discharge port 20b of the battery box 19 and the front-side opening 13a of the swing arm 13 are almost aligned with each other in the lateral direction and in the height direction of the motorcycle body while being disposed opposite to each other. Consequently, air discharged from the discharge port 20b is efficiently introduced into the front-side opening 13a by the cooling fan 22.

In addition, an air hole, through which the air flow space 24 and the equipment mounting space 23 communicate with each other, is formed in the part of the partition wall 25a where the power generating motor 16 is mounted. By the provision of the air hole, air introduced from the front-side opening 13a passes through the air flow space 24, subsequently flows from the air hole into the power generating motor 16, cools the inside of the power generating motor 16, and is then discharged to the atmosphere.

In addition, the power generating motor 16, the PDU 18, and the cooling fan 22 swing upward and downward together with the rear wheel WR according to the swinging of the swing arm 13.

Also, as shown in FIG. 5, a pair of left and right mounting parts 46 to support a main stand 45 is formed at the lower side of the swing arm 13 such that the mounting parts 46 are spaced apart from each other in the lateral direction of the motorcycle body. Consequently, the main stand 45 is mounted to the swing arm 13 by a mounting pin 46b inserted through mounting holes 46a of the mounting parts 46 (see FIG. 1) such that the main stand 45 swings together with the swing arm 13.

The following description is provided with respect to the weight balance in the left-and-right direction. In this embodiment, the PDU 18 and the power generating motor 16 are mounted to the swing arm 13, which swings about the pivot shaft 12 in the upward-and-downward direction.

Power from the battery group 9X including the plurality (two in this embodiment) of batteries 9 is supplied to the power generating motor 16 via the PDU 18.

Here, the center of gravity (the center-of-gravity position BC) of the plurality of the batteries 9 is located at the side opposite to the PDU 18 and the power generating motor 16 about the central line CX (see FIG. 2) of the motorcycle body.

More specifically, the center-of-gravity position SC of the swing arm 13, to which the PDU 18 and the power generating motor 16 are mounted, is located at the left side about the central line CX of the motorcycle body.

On the other hand, the two batteries 9 constituting the battery group 9X are accommodated in the two battery accommodating spaces 19X1 and 19X2, apart from the central line CX of the motorcycle body, among the battery accommodating spaces 19X1 to 19X3 in the battery box 19. As a result, as shown in FIG. 2, the center-of-gravity position BC of the batteries of the battery group 9X is located between the two batteries 9. That is, the center of gravity position BC is located at the right side about the central line CX of the motorcycle body, which is the side opposite to the PDU 18 and the power generating motor 16 about the central line CX of the motorcycle body.

As a result, the center-of-gravity position of the assembly of the battery group 9X and the swing arm 13 is closer to the central line CX of the motorcycle body than the center-of-gravity position BC of the batteries of the battery group 9X and the center-of-gravity position SC of the swing arm 13.

Consequently, it is possible to easily secure the weight balance of the electric motorcycle in the left-and-right direction.

Although, in the above description, the center-of-gravity position BC of the battery 9 (or the battery group 9X) is located at the side opposite to the power drive unit 18 and the power generating motor 16 about the central line CX of the motorcycle body. In addition to the above, the swing arm 13 and the battery group 9X may be disposed such that a moment $\omega S$ of the swing arm 13 at the center-of-gravity position SC of the swing arm 13 and a moment $\omega B$ of the battery group 9X at the center-of-gravity position BC of the battery group 9X are nearly balanced.

More specifically, it is assumed that the weight of the battery group 9X is WB, the weight of the swing arm 13 having the PDU 18 and the power generating motor 16 mounted thereto is WS, the distance between the center-of-gravity position BC of the battery group 9X and a vertically perpendicular plane including the central line CX of the motorcycle body is DB, and the distance between the center-of-gravity position SC of the swing arm 13 and the vertically perpendicular plane including the central line CX of the motorcycle body is DS.

In the following description, the difference in position in the upward-and-downward direction may be ignored (or such ignorance may not come into question) as when the center-of-gravity position BC of the battery group 9X and the center-of-gravity position SC of the swing arm 13 are located on almost the same horizontal plane HR, as shown in FIG. 1.

In this case, the moment $\omega S$ of the swing arm 13 is represented by the following equation.

$$\omega S = WS \cdot DS$$

On the other hand, the moment $\omega B$ of the battery group 9X is represented by the following equation.

$$\omega B = WB \cdot DB$$

Therefore, it is necessary for the following equations to be satisfied.

$$\omega S = \omega B$$

$$WS \cdot DS = WB \cdot DB$$

Specifically, when WS=7.5 kg and WB=30 kg, $$DB:DS = 1:4$$

since WS/WB=DB/DS.

For example, when DS=100 mm, $$DB = 100/4$$

$$= 25 \text{ mm}$$

In addition, in the first embodiment as described above, the battery box 19 configured to accommodate the battery group 9X has the plurality of battery accommodating spaces 19X1 and 19X2 that can accommodate the respective batteries 9. More specifically, it is possible to change the center-of-gravity position of the battery group 9X by appropriately selecting the battery accommodating spaces 19X1 to 19X3 that actually accommodate the respective batteries 9. Consequently, any one of the battery accommodating spaces 19X1 to 19X3 is selected as the space to accommodate the battery 9 constituting the battery group 9X such that the center-of-gravity position BC of the battery group 9X is most adjacent to the position where the distance DB between the center-of-gravity position BC of the battery group 9X and the central line CX of the motorcycle body is 25 mm.

According to the first embodiment as described above, it is possible to easily secure the weight balance between the batteries 9 (the battery group 9X), which are heavy, and the swing arm 13. Furthermore, it is possible to secure the weight balance of the electric motorcycle 1 in the left-and-right direction, thereby improving a degree of freedom in designing the electric motorcycle.

In the first embodiment as described above, the battery box 19 is disposed below the footrest space S, and all the batteries 9 are disposed in the battery box 19. In a second embodiment, on the other hand, batteries are additionally installed for a large-sized electric motorcycle further requiring the total battery capacity of the battery group 9X or to increase the total battery capacity of the battery group 9X such that the electric motorcycle can be driven for a longer period of time.

More specifically, in the second embodiment, two batteries are accommodated in a battery box 19 disposed below the footrest space S. In addition, batteries 9 are additionally installed in the vicinity of the head pipe 5 and in the vicinity of the rear frames 7.

As a result, according to the second embodiment, it is possible to increase the battery capacity and, in addition, to adjust the weight balance of the electric motorcycle in the frontward-and-rearward direction.

Figure 7:
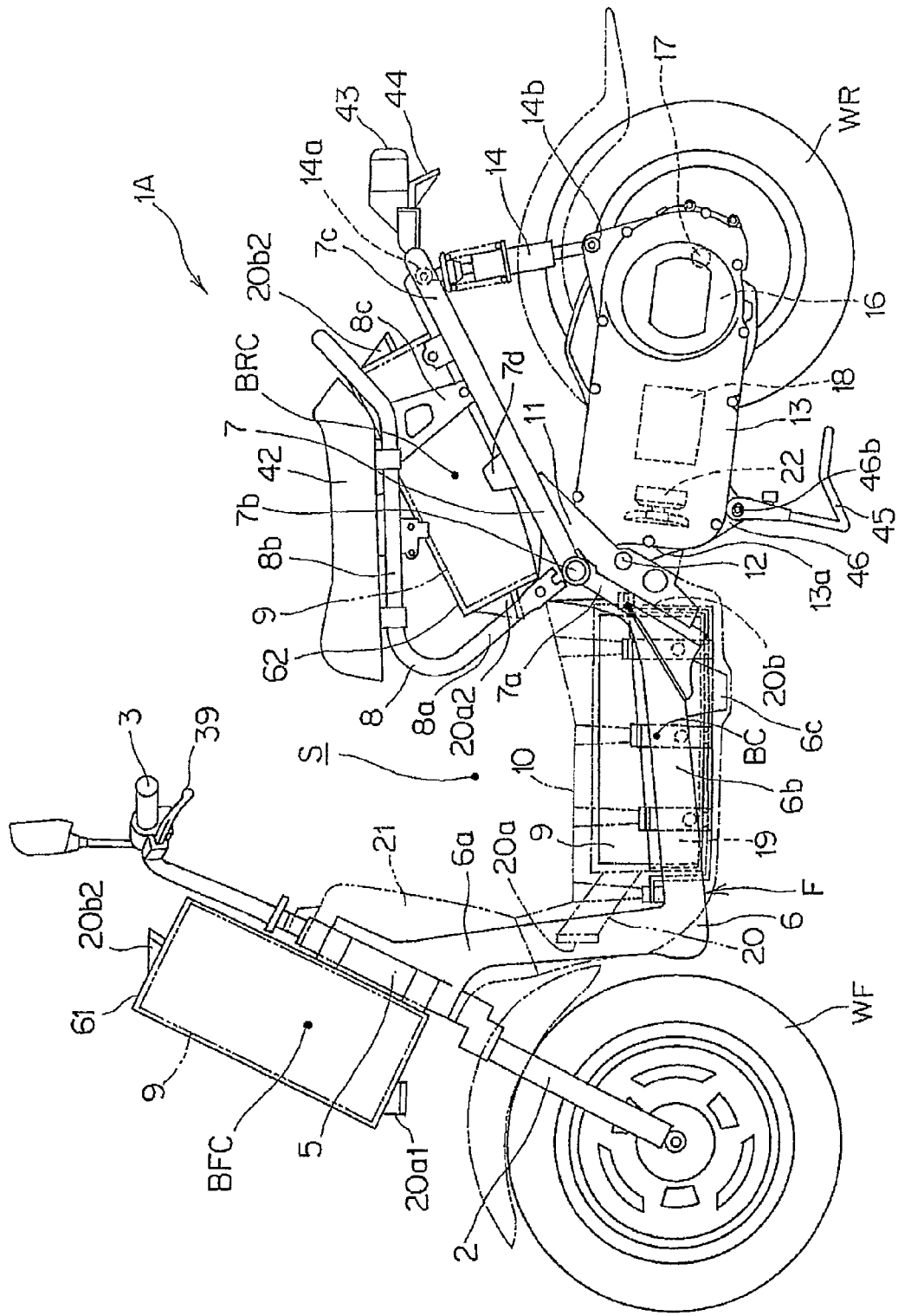
FIG. 7 is a side view illustrating an electric motorcycle according to a second embodiment of the present invention.

FIG. 7 is a side view illustrating an electric motorcycle according to a second embodiment of the present invention and FIG. 8 is a plan view of FIG. 7. The same components illustrated in FIGS. 7 and 8 as illustrated in FIGS. 1 and 2 are denoted by the same reference numerals, and a detailed description thereof is omitted.

In addition to the construction of the electric motorcycle 1 according to the first embodiment, the electric motorcycle 1A according to the second embodiment includes a front-side battery box 61 fixed to and supported by the head pipe 5 and a rear-side battery box 62 fixed to and supported by the second inclined parts 7c of the rear frames 7.

The front-side battery box 61 and the rear-side battery box 62 are basically identical in construction to the battery box 19 of the first embodiment except that the shape and disposition of air introduction ducts to introduce external air into the boxes and discharge ports to discharge the introduced air are slightly different. However, the front-side battery box 61 and the rear-side battery box 62 are constructed to accommodate batteries 9 in all battery accommodating spaces.

In the second embodiment, each of the battery boxes 61 and 62, each of which accommodates a battery 9 or a battery group 9X, has a plurality (three in this embodiment) of battery accommodating spaces to accommodate the batteries 9. Weight balance in the frontward-and-rearward direction is secured by changing the battery accommodating spaces in which the batteries 9 are accommodated.

Next, the additional installation of the batteries and weight balance in the frontward-and-rearward direction and in the left-and-right direction will be described.

In the second embodiment, the total number of batteries 9 to be accommodated in the front-side battery box 61 and the rear-side battery box 62, i.e., the number of batteries 9 to be additionally installed, is set based on required battery capacity.

Subsequently, the center-of-gravity position BFC of the front-side batteries is set by appropriately setting the number of batteries 9 to be accommodated in the front-side battery box 61 and battery accommodating spaces as positions in which the batteries are to be accommodated in consideration of the weight balance in the frontward-and-rearward direction.

In the same manner, the center-of-gravity position BRC of the rear-side batteries is set by appropriately setting the number of batteries 9 to be accommodated in the rear-side battery box 62 and battery accommodating spaces as positions in which the batteries are to be accommodated.

In this case, the weight in the left-and-right direction is unbalanced when the center-of-gravity position BFC of the front-side batteries and the center-of-gravity position BRC of the rear-side batteries are merely set in the frontward-and-rearward direction with respect to the center-of-gravity position of the motorcycle before the battery 9 (or the battery group 9X) is accommodated in the front-side battery box 61 or the rear-side battery box 62.

Consequently, when a battery 9 is accommodated in, for example, the battery accommodating space 61X1, among the battery accommodating spaces 61X1 to 61X3 in the front-side battery box 61, and a battery 9 is also accommodated in the rear-side battery box 62, the battery 9 is accommodated in the battery accommodating space 62X3, which most secures the left-and-right balance, among the battery accommodating spaces 62X1 to 62X3 in the rear-side battery box 62. More specifically, as shown in FIG. 8, the battery accommodating space 62X3 among the battery accommodating spaces 62X1 to 62X3 is so located that the battery accommodating space wherein the distance from the central line CX of the motorcycle body to the center-of-gravity position of the accommodated battery 9 is most approximate to the distance from the central line CX of the motorcycle body to the center-of-gravity position of the battery 9 accommodated in the battery accommodating space 61X1.

In this case, when the number of batteries accommodated in the front-side battery box 61 is different from the number of batteries in the rear-side battery box 62, the same process is carried out at the center-of-gravity position of all the accommodated batteries. In addition, when no battery is accommodated in the front-side battery box 61 or in the rear-side battery box 62, the center-of-gravity position of the battery box in which no battery is accommodated is regarded as being on the central line CX of the motorcycle body.

As a result, when it is necessary to additionally install the batteries 9 such that the power generating motor 16 provides higher power and is driven for a longer period of time, it is possible to secure the weight balance of the motorcycle in the frontward-and-rearward direction and the weight balance of the motorcycle in the left-and-right direction about the central line CX of the motorcycle body in addition to the increase of battery capacity.

In the above description, only the distance to the center-of-gravity position is considered when securing the weight balance in the left-and-right direction. However, in the same manner as the modification of the first embodiment, it is also possible to dispose the battery 9 (or the battery group 9X) in the front-side battery box 61 and to dispose the battery 9 (or the battery group 9X) in the rear-side battery box 62, such that a moment of the corresponding battery 9 (or the battery group 9X) at the center-of-gravity position BFC of the front-side batteries around a horizontal line extending in the left-and-right direction of the motorcycle and a moment of the corresponding battery 9 at the center-of-gravity position BRC of the rear-side batteries around the horizontal line are nearly balanced, through the center-of-gravity position of the motorcycle before the battery 9 (or the battery group 9X) is accommodated in the front-side battery box 61 or the rear-side battery box 62.

According to the second embodiment as described above, when it is necessary to additionally install the batteries 9, which are heavy, in the aspect of a battery capacity, it is possible to increase the battery capacity and, in addition, to secure the weight balance. Furthermore, it is possible to improve a degree of freedom in designing the electric motorcycle.

In the above description, the weight balance between the batteries and the swing arm or between the batteries is secured on the premise that the weight balance except the batteries and the swing arm is maintained. However, it may be possible to secure the weight balance between components or members or the like except the batteries and the swing aim.

In the above description, the battery accommodating space 19X3 of the battery box 19 is used to minutely adjust the center-of-gravity position of the batteries 9. When the battery accommodating space 19X3 is not necessary, however, the battery accommodating space 19X3 may be omitted, thereby achieving miniaturization of the battery box 19. In the same manner, some of the battery accommodating spaces of the front-side battery box 61 and the rear-side battery box 62 may be omitted depending upon the use mode thereof, thereby achieving miniaturization of the front-side battery box 61 and the rear-side battery box 62.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric motorcycle comprising:
a power drive unit and a driving power generating motor mounted to a swing arm swinging about a pivot shaft in an upward-and-downward direction, said power generating motor driving a rear wheel of the motorcycle;
a battery for supplying electric power to the power generating motor, and
a center of gravity of the battery is located at a side opposite to the power drive unit and the power generating motor about a central line of a motorcycle body.

2. The electric motorcycle according to claim 1, wherein the center of gravity of the battery and a center of gravity of the swing arm are located on almost the same horizontal plane.

3. The electric motorcycle according to claim 1, wherein a battery box is disposed below a footrest space, and the battery is disposed in the battery box.

4. The electric motorcycle according to claim 2, wherein a battery box is disposed below a footrest space, and the battery is disposed in the battery box.

5. The electric motorcycle according to claim 3, wherein a step floor of the footrest space is formed in an openable and closable manner, and an opening formed at a top of the battery box, in which the battery is accommodated, is covered by the step floor in a hermetically sealed manner.

6. The electric motorcycle according to claim 4, wherein a step floor of the footrest space is formed in an openable and closable manner, and an opening formed at a top of the battery box, in which the battery is accommodated, is covered by the step floor in a hermetically sealed manner.

7. The electric motorcycle according to claim 1, wherein a battery is additionally installed in the vicinity of at least one of a head pipe and a rear frame.

8. The electric motorcycle according to claim 2, wherein a battery is additionally installed in the vicinity of at least one of a head pipe and a rear frame.

9. The electric motorcycle according to claim 3, wherein a battery is additionally installed in the vicinity of at least one of a head pipe and a rear frame.

10. The electric motorcycle according to claim 4, wherein a battery is additionally installed in the vicinity of at least one of a head pipe and a rear frame.

11. An electric motorcycle comprising:
a power drive unit;
a swing arm operatively connected to a motorcycle body, said swing arm swinging about a pivot shaft in an upward-and-downward direction;
a driving power generating motor operatively mounted to said swing arm;
a rear wheel of the electric motorcycle being operative connected to said power generating motor for imparting rotation to the rear wheel;
a battery for supplying electric power to the power generating motor; and
a center of gravity of the battery is located at a side opposite to the power drive unit and the power generating motor about a central line of the motorcycle body.

12. The electric motorcycle according to claim 11, wherein the center of gravity of the battery and a center of gravity of the swing arm are located on almost the same horizontal plane.

13. The electric motorcycle according to claim 11, wherein a battery box is disposed below a footrest space, and the battery is disposed in the battery box.

14. The electric motorcycle according to claim 12, wherein a battery box is disposed below a footrest space, and the battery is disposed in the battery box.

15. The electric motorcycle according to claim 13, wherein a step floor of the footrest space is formed in an openable and closable manner, and an opening formed at a top of the battery box, in which the battery is accommodated, is covered by the step floor in a hermetically sealed manner.

16. The electric motorcycle according to claim 14, wherein a step floor of the footrest space is formed in an openable and closable manner, and an opening formed at a top of the battery box, in which the battery is accommodated, is covered by the step floor in a hermetically sealed manner.

17. The electric motorcycle according to claim 11, wherein a battery is additionally installed in the vicinity of at least one of a head pipe and a rear frame.

18. The electric motorcycle according to claim 12, wherein a battery is additionally installed in the vicinity of at least one of a head pipe and a rear frame.

19. The electric motorcycle according to claim 13, wherein a battery is additionally installed in the vicinity of at least one of a head pipe and a rear frame.

20. The electric motorcycle according to claim 14, wherein a battery is additionally installed in the vicinity of at least one of a head pipe and a rear frame.

* * * * *